(12) United States Patent
Reeve et al.

(10) Patent No.: US 11,086,829 B2
(45) Date of Patent: Aug. 10, 2021

(54) COMPARING SCHEMA DEFINITIONS USING SAMPLING

(71) Applicant: International Business Machines Corporation, Armonk, NY (US)

(72) Inventors: John Anthony Reeve, Winchester (GB); Andrew John Coleman, Petersfield (GB); Trevor Clifford Dolby, Winchester (GB); Matthew E. Golby-Kirk, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/732,876

(22) Filed: Jan. 2, 2020

(65) Prior Publication Data

US 2021/0209073 A1 Jul. 8, 2021

(51) Int. Cl.
*G06F 16/21* (2019.01)
*G06F 16/93* (2019.01)
*G06F 16/25* (2019.01)

(52) U.S. Cl.
CPC .......... *G06F 16/213* (2019.01); *G06F 16/252* (2019.01); *G06F 16/93* (2019.01)

(58) Field of Classification Search
CPC ....... G06F 16/213; G06F 16/93; G06F 16/252
USPC ....................................................... 715/200
See application file for complete search history.

(56) References Cited

U.S. PATENT DOCUMENTS

| | | | |
|---|---|---|---|
| 9,195,691 B2 * | 11/2015 | Eker | G06F 16/2365 |
| 9,201,558 B1 * | 12/2015 | Dingman | G06F 15/16 |
| 9,507,874 B2 * | 11/2016 | Pitschke | G06F 16/84 |
| 9,582,606 B2 * | 2/2017 | Pitschke | G06F 16/84 |
| 10,169,483 B2 * | 1/2019 | Pitschke | G06F 16/80 |
| 10,452,975 B2 * | 10/2019 | Jacob | G06F 16/25 |
| 10,831,826 B2 * | 11/2020 | Pitschke | G06F 40/205 |
| 2003/0140308 A1 * | 7/2003 | Murthy | G06F 16/284 715/234 |
| 2005/0071359 A1 * | 3/2005 | Elandassery | G06F 16/213 |
| 2005/0160164 A1 * | 7/2005 | Benfield | G06F 40/197 709/223 |
| 2005/0198630 A1 * | 9/2005 | Tamma | G06F 16/213 717/175 |
| 2005/0229097 A1 * | 10/2005 | Lander | G06F 40/14 715/243 |
| 2006/0085465 A1 * | 4/2006 | Nori | G06F 16/213 |
| 2006/0087668 A1 * | 4/2006 | Takahashi | G06F 40/14 358/1.13 |
| 2006/0155725 A1 * | 7/2006 | Foster | G06F 16/88 |

(Continued)

OTHER PUBLICATIONS

Crockford, "Introducing JSON, How JavaScript Works," ECMA-404 the JSON Data Interchange Standard, npm, Inc., 2018, 12 pages.

*Primary Examiner* — Hassan Mrabi
(74) *Attorney, Agent, or Firm* — VanLeeuwen & VanLeeuwen; Alexander G. Jochym

(57) ABSTRACT

An approach is provided in which the approach generates a first set of sample documents based on a first schema and generates a second set of sample documents based on a second schema. The approach determines a set of validation results by comparing the first set of sample documents against the second schema and comparing the second set of sample documents against the first schema. The approach evaluates the set of validation results and declares a type of equivalence between the first schema and the second schema accordingly.

20 Claims, 10 Drawing Sheets

| | First Schema Validates Second Schema Sample Documents | Second Schema Validates First Schema Sample Documents | Declaration |
|---|---|---|---|
| 440 | Pass | Pass | First Schema and Second Schema are EQUIVALENT |
| 450 | Pass | Fail | First Schema is SUPERSET of Second Schema |
| 460 | Fail | Pass | Second Schema is SUPERSET of First Schema |
| 470 | Fail | Fail | First Schema and Second Schema UNRELATED |

(56) References Cited

U.S. PATENT DOCUMENTS

| | | | | |
|---|---|---|---|---|
| 2009/0083294 A1* | 3/2009 | Gao | .................. | G06F 40/226 |
| 2009/0144610 A1* | 6/2009 | Sheldon | ................ | G06F 40/221 |
| | | | | 715/234 |
| 2010/0250610 A1* | 9/2010 | Kanawa | ................ | G06F 16/93 |
| | | | | 707/796 |
| 2013/0007068 A1* | 1/2013 | Pitschke | ............... | G06F 40/205 |
| | | | | 707/803 |
| 2013/0179769 A1* | 7/2013 | Gurfinkel | ............... | G06F 40/14 |
| | | | | 715/234 |
| 2013/0262399 A1* | 10/2013 | Eker | .................. | G06F 16/2365 |
| | | | | 707/687 |
| 2018/0004799 A1* | 1/2018 | Eker | ..................... | G06F 16/213 |
| 2018/0095952 A1* | 4/2018 | Rehal | .................... | G06F 16/213 |
| 2018/0285407 A1* | 10/2018 | Austin | .................. | G06F 16/213 |
| 2019/0005073 A1* | 1/2019 | Prabhakar | ............. | G06F 16/213 |
| 2019/0073388 A1* | 3/2019 | Desmarets | ........... | G06F 16/213 |
| 2019/0073432 A1* | 3/2019 | Pitschke | ................ | G06F 16/84 |
| 2019/0138609 A1* | 5/2019 | Taleghani | ............. | G06F 40/279 |
| 2019/0312933 A1* | 10/2019 | Richards | ........... | G06F 16/24552 |
| 2019/0377713 A1* | 12/2019 | Lankford | ............. | G06F 16/213 |
| 2020/0012935 A1* | 1/2020 | Goodsitt | ............... | G06F 16/285 |

\* cited by examiner

400 ↘

| | First Schema Validates Second Schema Sample Documents | Second Schema Validates First Schema Sample Documents | Declaration |
|---|---|---|---|
| 440 | Pass | Pass | First Schema and Second Schema are EQUIVALENT |
| 450 | Pass | Fail | First Schema is SUPERSET of Second Schema |
| 460 | Fail | Pass | Second Schema is SUPERSET of First Schema |
| 470 | Fail | Fail | First Schema and Second Schema UNRELATED |

(column headers: 410, 420, 430)

*FIG. 4*

```
{
"$schema": "http://example.org/complex1",
"title": "Complex schema 1",
"description": "A made up complex schema",
"type": "object",
"properties": {
  "billing_address": {
    "type": "object",
    "description": "billing address",
    "properties": {
      "street_address": { "type": "string"},
      "city":          { "type": "string" },
      "state":         { "type": "string" , "pattern": ".*" }
    },
    "required": ["street_address", "city", "state"]
  },
  "shipping_address": {
    "description": "shipping address",
    "type": "object",
    "properties": {
      "street_address": { "type": "string", "pattern": ".*" },
      "city":          { "type": "string" },
      "state":         { "type": "string" }
    },
    "patternProperties": {
      "^type$": {"enum": [ "residential", "business" ] }
    },
    "required": ["type","street_address", "city", "state"]
  }
 }
}
```

1000

```
{
"$schema": "http://json-schema.org/draft-06/schema#",
"definitions": {
  "address": {
    "type": "object",
    "properties": {
      "street_address": { "type": "string" },
      "city":          { "type": "string" },
      "state":         { "type": "string" }
    },
    "required": ["street_address", "city", "state"]
  }
},
"type": "object",
"properties": {
  "billing_address": { "oneOf" : [{"$ref": "#/definitions/address" }]},
  "shipping_address": {
    "allOf": [
      { "$ref": "#/definitions/address" },
      { "properties":
         { "type": { "enum": [ "residential", "business" ] } },
         "required": ["type"]
      }
    ]
  }
 }
}
```

COMPARING SCHEMA DEFINITIONS USING SAMPLING

BACKGROUND

A schema defines the content of a document. One common schema type is XML (eXtensible Markup Language), which defines allowed content in an XML document. Another common schema type is JSON (JavaScript Object Notation), which defines allowed content in a JSON document.

An XML schema is typically expressed in terms of constraints on the structure and content of XML documents of that type. These constraints are generally expressed using a combination of grammatical rules governing the order of elements, Boolean predicates that the content must satisfy, data types governing the content of elements and attributes, and more specialized rules such as uniqueness and referential integrity constraints.

Similarly, a JSON schema specifies a JSON-based format to define the structure of JSON data for validation, documentation, and interaction control. The JSON schema provides a contract for the JSON data required by a given application and how the JSON data can be modified. A JSON schema is based on the concepts from XML Schema (XSD) but is JSON-based. Both XML schemas and JSON schemas are normally coded in plain text, are human readable, and are often modified using text editors and stored in standard code repositories.

BRIEF SUMMARY

According to one embodiment of the present disclosure, an approach is provided in which the approach generates a first set of sample documents based on a first schema and generates a second set of sample documents based on a second schema. The approach determines a set of validation results by comparing the first set of sample documents against the second schema and comparing the second set of sample documents against the first schema. The approach evaluates the set of validation results and declares a type of equivalence between the first schema and the second schema accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting a list of schema declaration results based on document validation testing;

FIG. 10 is an exemplary diagram depicting two complex schemas.

DETAILED DESCRIPTION

Figure 1:
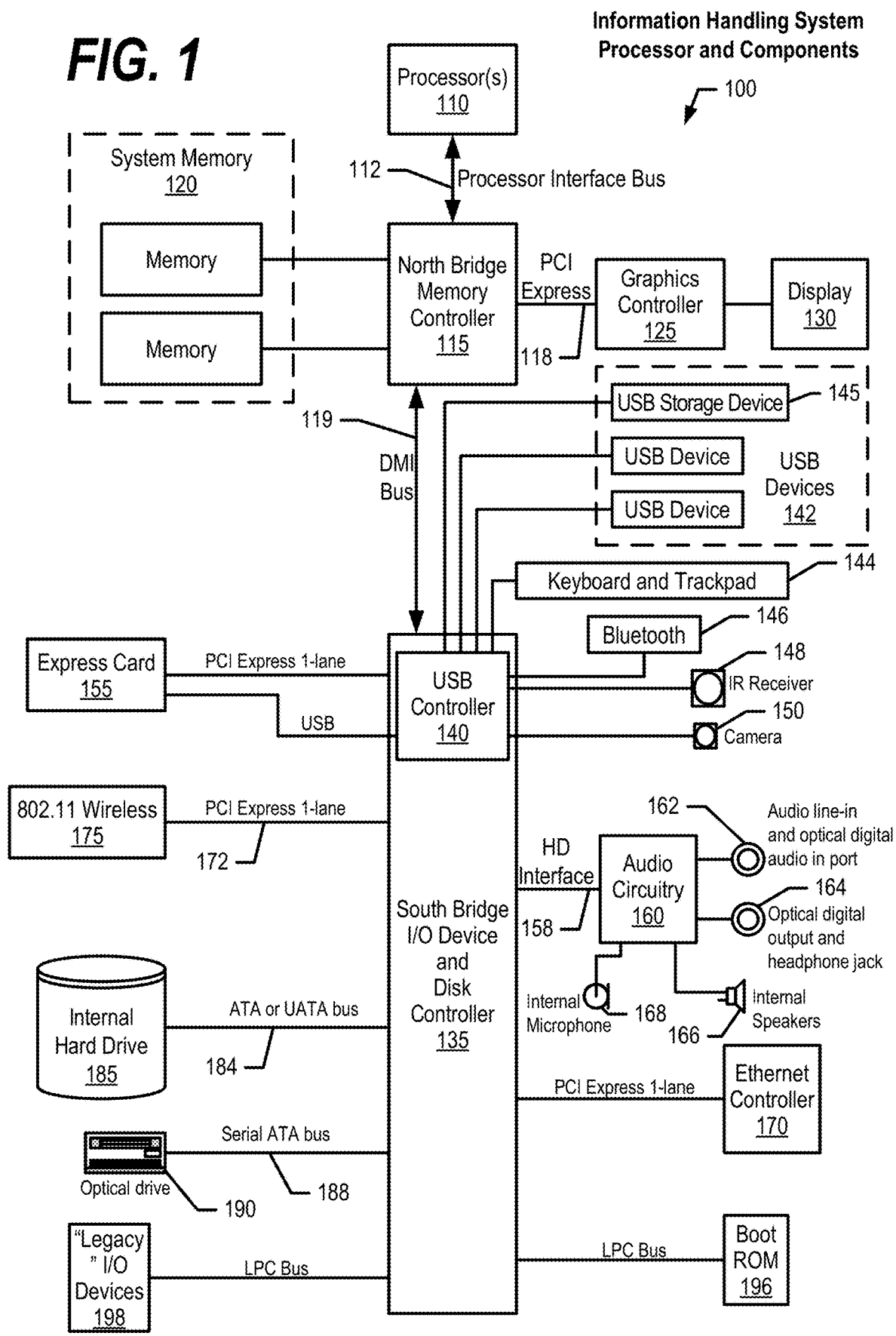
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
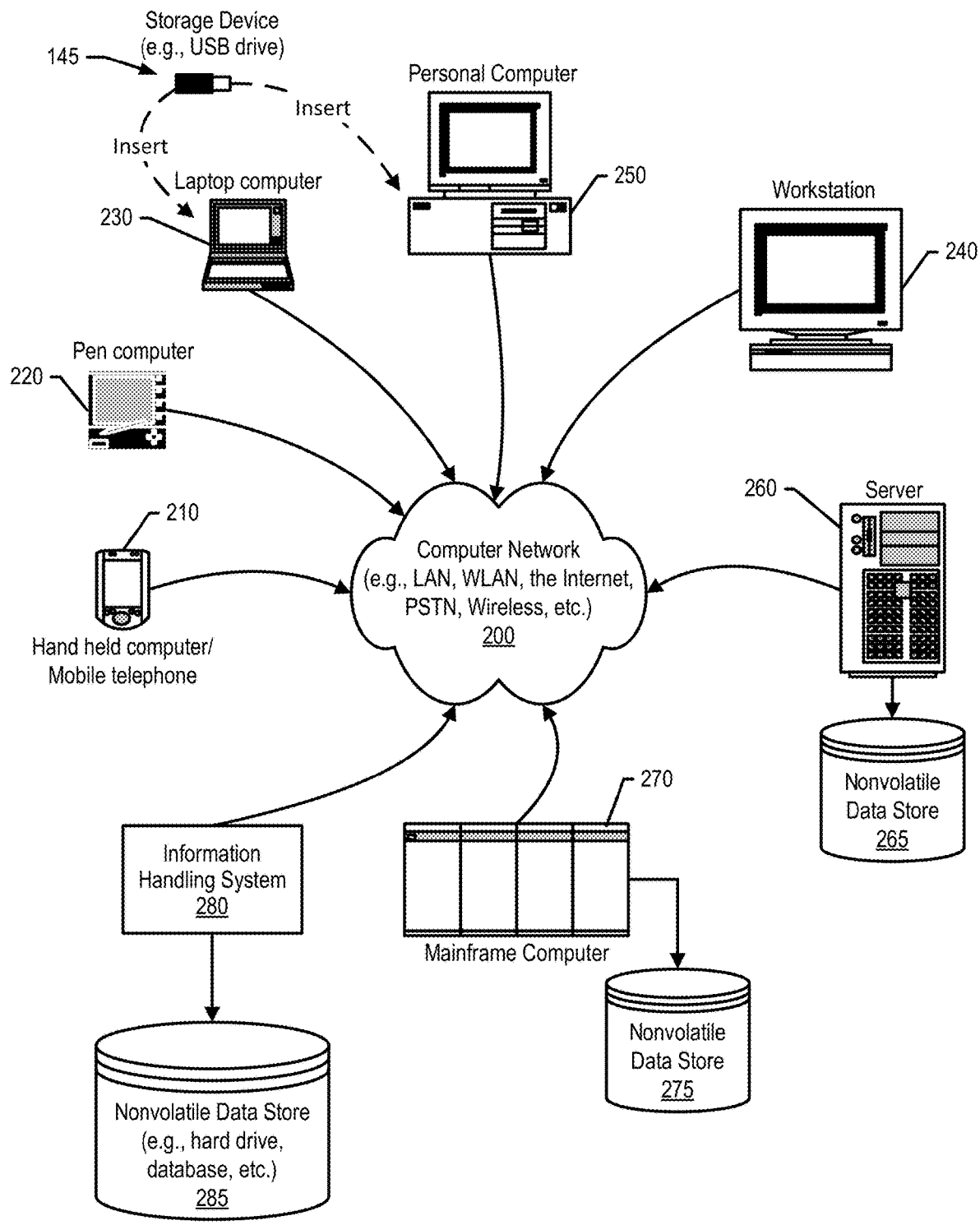
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, schemas are often modified using text editors and stored in standard code repositories. When a user modifies a schema, the modifications can be compared using standard code diff tools, which produce results similar to a document comparison tool. For example, if the change is minor, such as adding a new allowed field or constraining the value allowed in a field, the diff tool results will highlight the minor changes. For major changes, such as by using a rich set of mechanisms to change the look of a schema file, the diff tool shows the whole schema file as having changed even though the documents the schema would find as valid has not changed.

FIGS. 3 through 10 depict an approach that can be executed on an information handling system that generates and validates sample documents to determine whether two schemas are equivalent (produce the same documents), a superset of one another, or unrelated. The information handling system systematically generates a first set of sample documents based on a first schema and validates the first set of sample documents against a second schema to determine whether the first set of sample documents are valid based on the second schema. The information handling system then repeats the process and generates a second set of sample documents based on the second schema and validates the second set of sample documents against the first schema to determine whether the second set of sample documents are valid based on the first schema.

When both processes complete and both validation processes pass, then the information handling system determines that both schemas are considered equivalent within a given confidence based on the amount of sample documents that were generated. When the first schema's generated documents are not validated by the second schema, but the second schema's generated documents are validated by the first schema, then the information handling system determines that the first schema is a superset of the second schema within a given confidence. When the first schema's generated documents are not validated by the second schema, and the second schema's generated documents are not validated by the first schema, then the information handling system determines that the first schema and the second schema are unrelated.

In one embodiment, to ensure that the sample documents thoroughly capture the boundary conditions (edges) of the schema-under-test (SuT) from which the sample documents are generated, the information handling system systematically works its way through each element of the SuT to generate documents that test the SuT's boundary cases to ensure they are evaluated by the validating schema.

Figure 3:
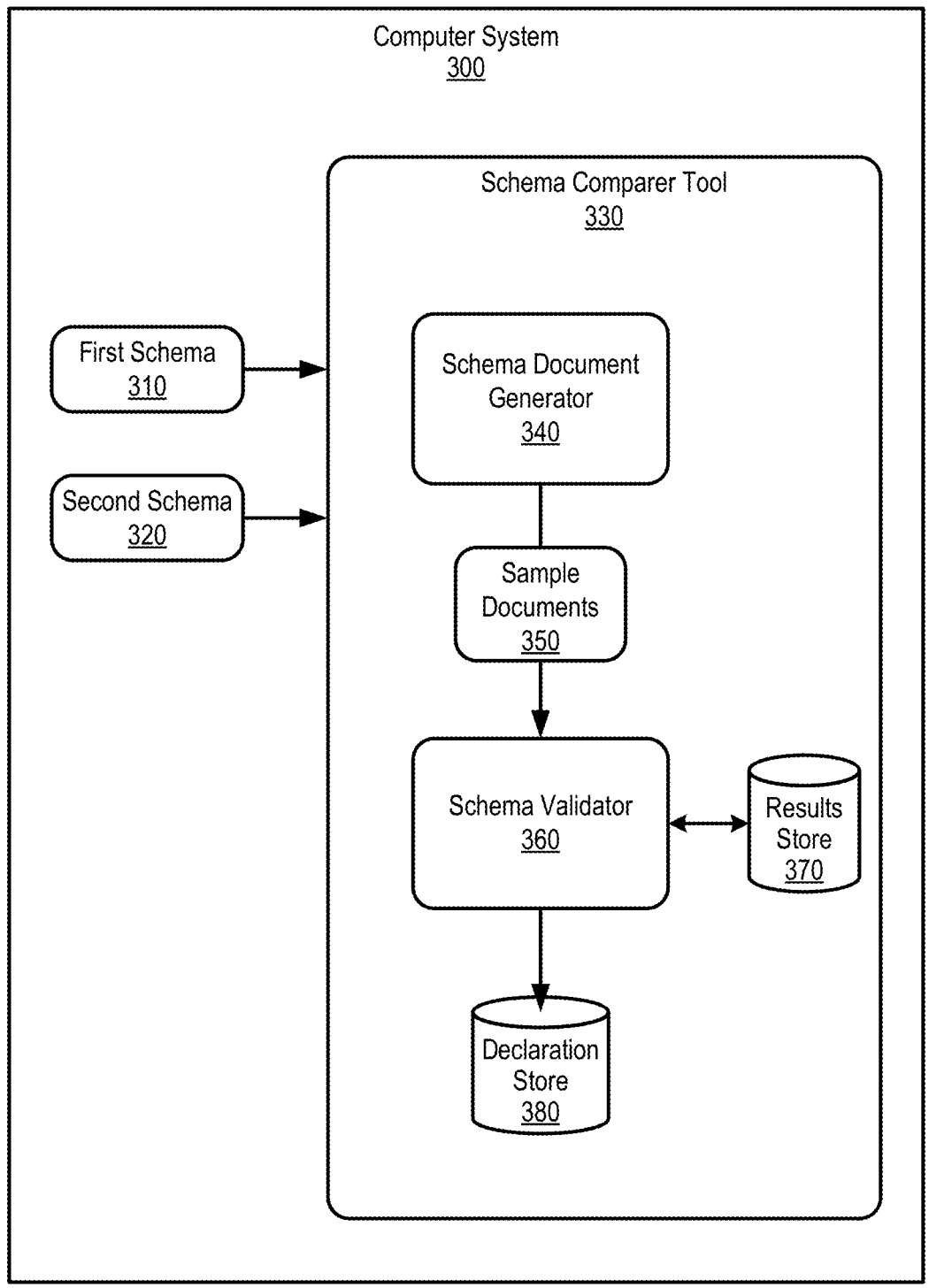
FIG. 3 is an exemplary diagram depicting a schema comparer tool 330 that declares a type of equivalence between two schemas.

FIG. 3 is an exemplary diagram depicting a schema comparer tool 330 that declares a type of equivalence between two schemas. As discussed herein, schema comparer tool 330 generates sample documents concentrating on boundary conditions rather than random values and uses a large number of randomly generated samples based on one of the schemas to check the compatibility of the other schema.

Computer system 300 includes schema comparer tool 330. Schema comparer tool 330 receives first schema 310 and second schema 320. Schema comparer tool 330 uses schema document generator 340 to generate sample documents 350 based on first schema 310. In one embodiment, schema document generator 340 is configured to generate sample documents 350 that tend to have values around boundary conditions. For example, if first schema 310 includes a string field that is defined as having a length of between 2-8 characters, then schema document generator 340 chooses sample fields of 2 or 8 characters rather than random values between 2 and 8 to reduce the number of sample documents 350 to generate.

Schema comparer tool 330 then executes schema validator 360 against sample documents 350 based on second schema 320. Schema comparer tool 330 performs steps of checking whether each of sample documents 350 conforms to second schema 320. Schema validator 360 then records the result (pass/fail) in results store 370.

In one embodiment, to minimize unnecessary processing resources, schema document generator 340 generates one sample document 350 at a time and, if the single sample document 350 is validated against second schema 320 by schema validator 360, then schema validator 360 informs schema document generator 340 to generate another sample document 350 for validation by schema validator 360. This process repeats until the amount of validated documents reaches a threshold (see FIG. 8 and corresponding text for further details).

Next, schema document generator 340 uses second schema 320 to generate a second set of sample documents 350 and schema validator 360 validates the second set of sample documents 350 using first schema 310. Once both sets of testing are complete, schema validator 360 evaluates both sets of tests results and stores a schema declaration, in one embodiment, of equivalent, superset, or unrelated, in declarations store 380 (see FIG. 4 and corresponding text for further details).

FIG. 4 is an exemplary diagram depicting schema declaration results based on validation testing. Table 400 includes columns 410, 420, and 430. Column 410 includes a list of results of whether first schema 310 validates each of the sample documents 350 generated from second schema 320. Column 420 includes a list of results of whether second schema 320 validates each of the sample documents 350 generated from first schema 310. And, column 430 includes a list of declarations based on the results in columns 410 and 420.

Row 440 shows that if both sets of tests complete without any failed validations, then first schema 310 and second schema 320 are declared equivalent within a given confidence. Row 450 shows that if first schema 310 successfully validated all sample documents generated from second schema 320, but second schema 320 failed to validate at least one of the sample documents generated from first schema 310, then first schema 310 is declared a superset of second schema 320 within a given confidence.

Row 460 shows that if second schema 320 successfully validated all sample documents generated from first schema 310, but first schema 310 failed to validate at least one of the sample documents generated from second schema 320, then second schema 320 is declared a superset of first schema 310 within a given confidence. And, row 470 shows that if both first schema 310 and second schema 320 failed their corresponding validation tests, then first schema 310 and second schema 320 are declared unrelated. In one embodiment, as discussed herein, schema comparer tool 330 assigns a confidence value to the declaration based on the amount of validated sample documents.

Figure 5:
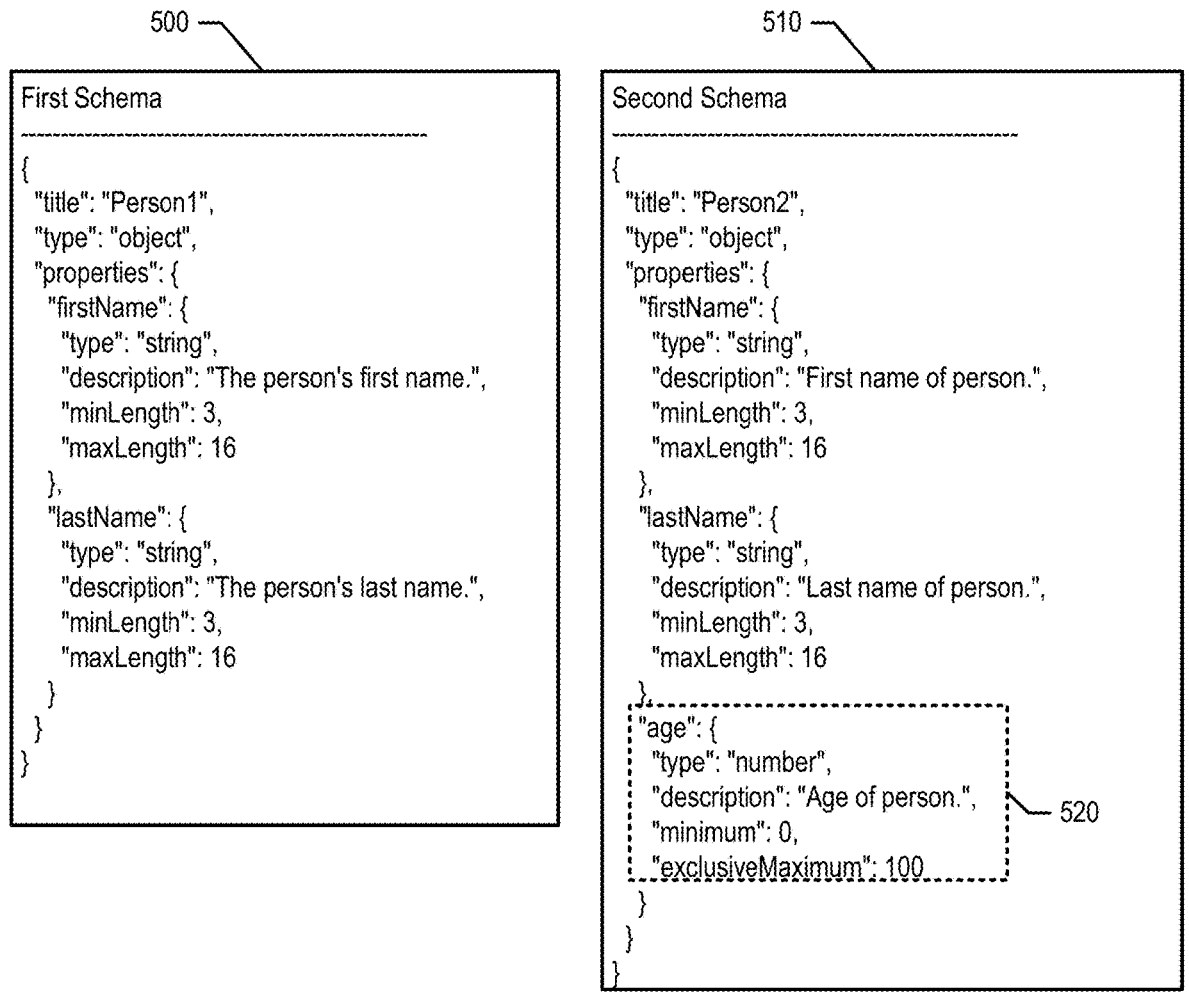
FIG. 5 is an exemplary diagram depicting two basic schemas that schema comparer tool 330 evaluates.

FIG. 5 is an exemplary diagram depicting two basic schemas that schema comparer tool 330 evaluates. Schema 500 and schema 510 are similar with the exception that schema 510 includes code 520. As such, because schema 510 includes at least the same "code" as schema 500, schema 510 will validate each of the sample documents generated from schema 500 (see FIG. 6 and corresponding text for further details). However, because schema 510 has extra code 520, schema 500 will not be able to validate each of the sample documents generated from schema 510 (see FIG. 7 and corresponding text for further details). Therefore, schema validator 360 determines that schema 510 is a superset of schema 500 within a given confidence (see FIG. 4 and corresponding text for further details).

Figure 6:
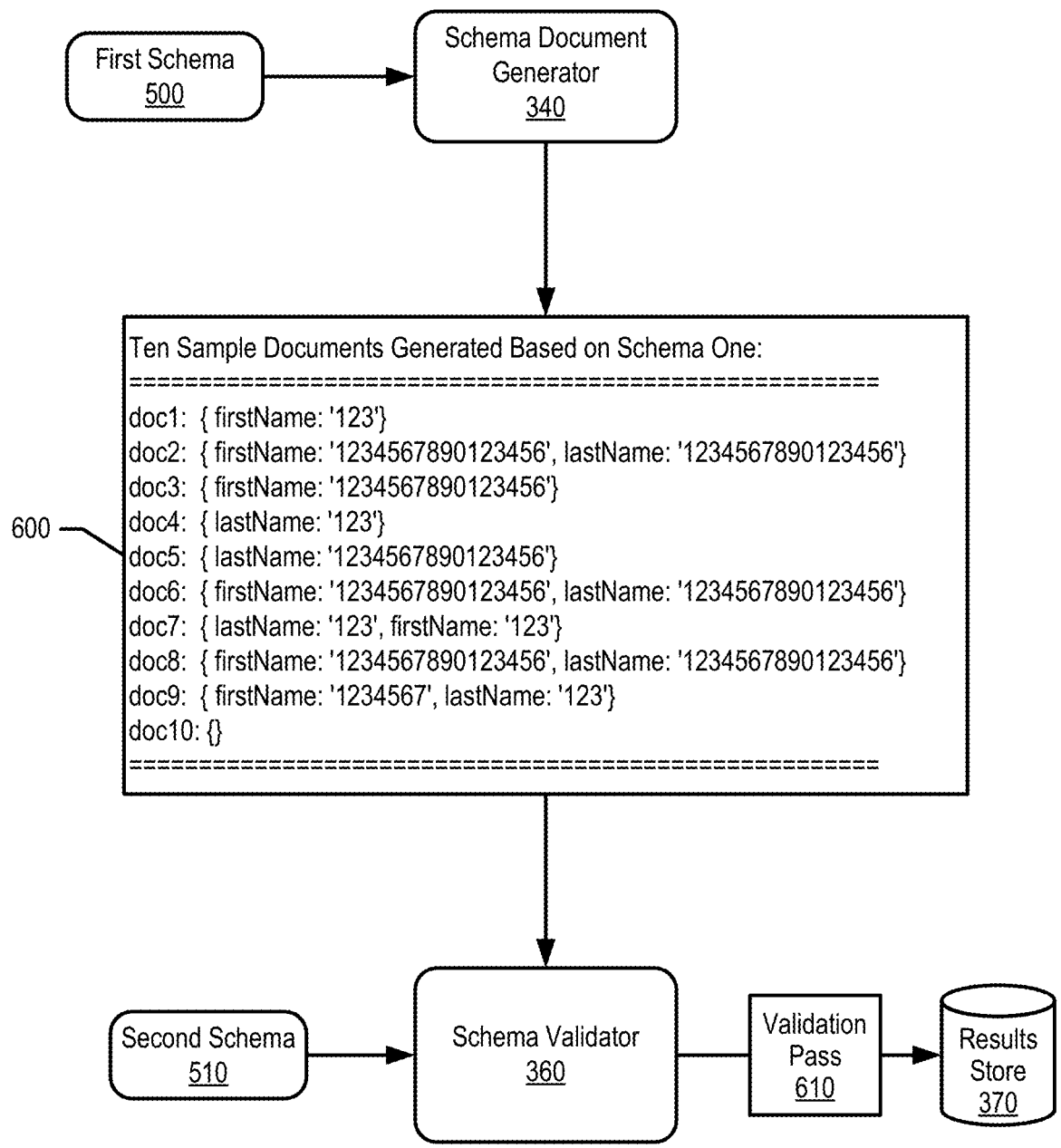
FIG. 6 is an exemplary diagram depicting documents generated from a first schema and validated against a second schema.

FIG. 6 is an exemplary diagram depicting documents generated from first schema 500 and validated against second schema 510. Schema document generator 340 brings in first schema 500 (see FIG. 5 and corresponding text for further details) and generates sample documents 600. The example shown in FIG. 6 shows that schema document generator 340 generated ten separate documents.

Schema validator 360 compares sample documents 600 against second schema 510 (see FIG. 5 and corresponding text for further details). As discussed above, schema validator 360 determines that each of the ten documents in sample documents 600 are validated against second schema 510 and stores validation "Pass" 610 in results store 370 accordingly.

Figure 7:
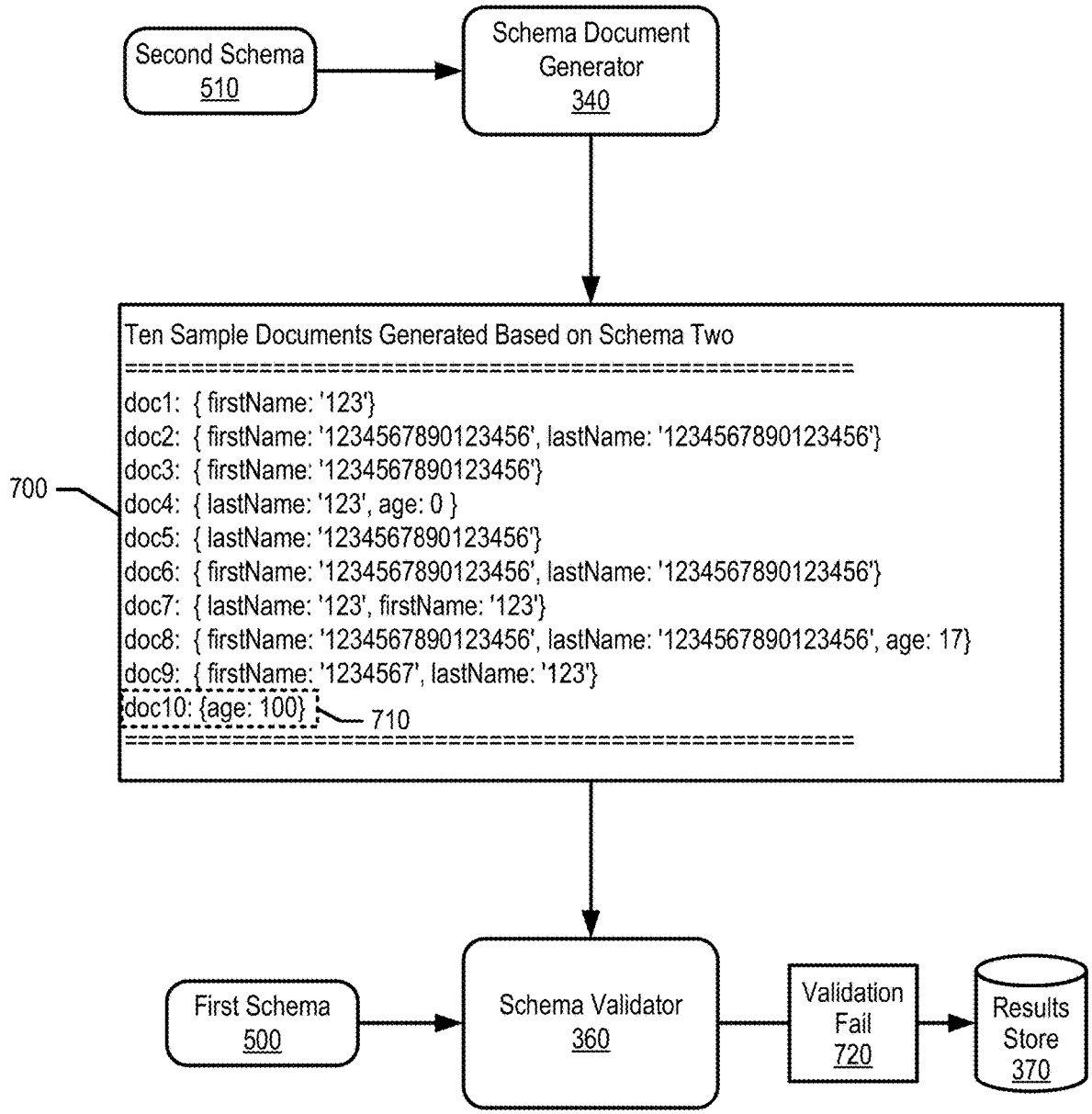
FIG. 7 is an exemplary diagram depicting documents generated from a second schema and validated against a first schema.

FIG. 7 is an exemplary diagram depicting documents generated from second schema 510 and validated against first schema 500. Schema document generator 340 brings in second schema 510 and generates sample documents 700, which includes document 710 which is different from one of sample documents 600 in FIG. 6 because second schema 510 includes extra code 520 shown in FIG. 5.

Schema validator 360 compares sample documents 700 against first schema 500, and determines that at least one of the ten documents (document 710) could not be validated against first schema 500. As such, schema validator 360 stores validation "Fail" 720 in results store 370 accordingly. In turn, schema validator 360 evaluates validation Fail 720 and validation Pass 610 from FIG. 6 and determines that second schema 510 is a superset of first schema 500 within a given confidence (see FIGS. 4, 9, and corresponding text for further details).

Figure 8:
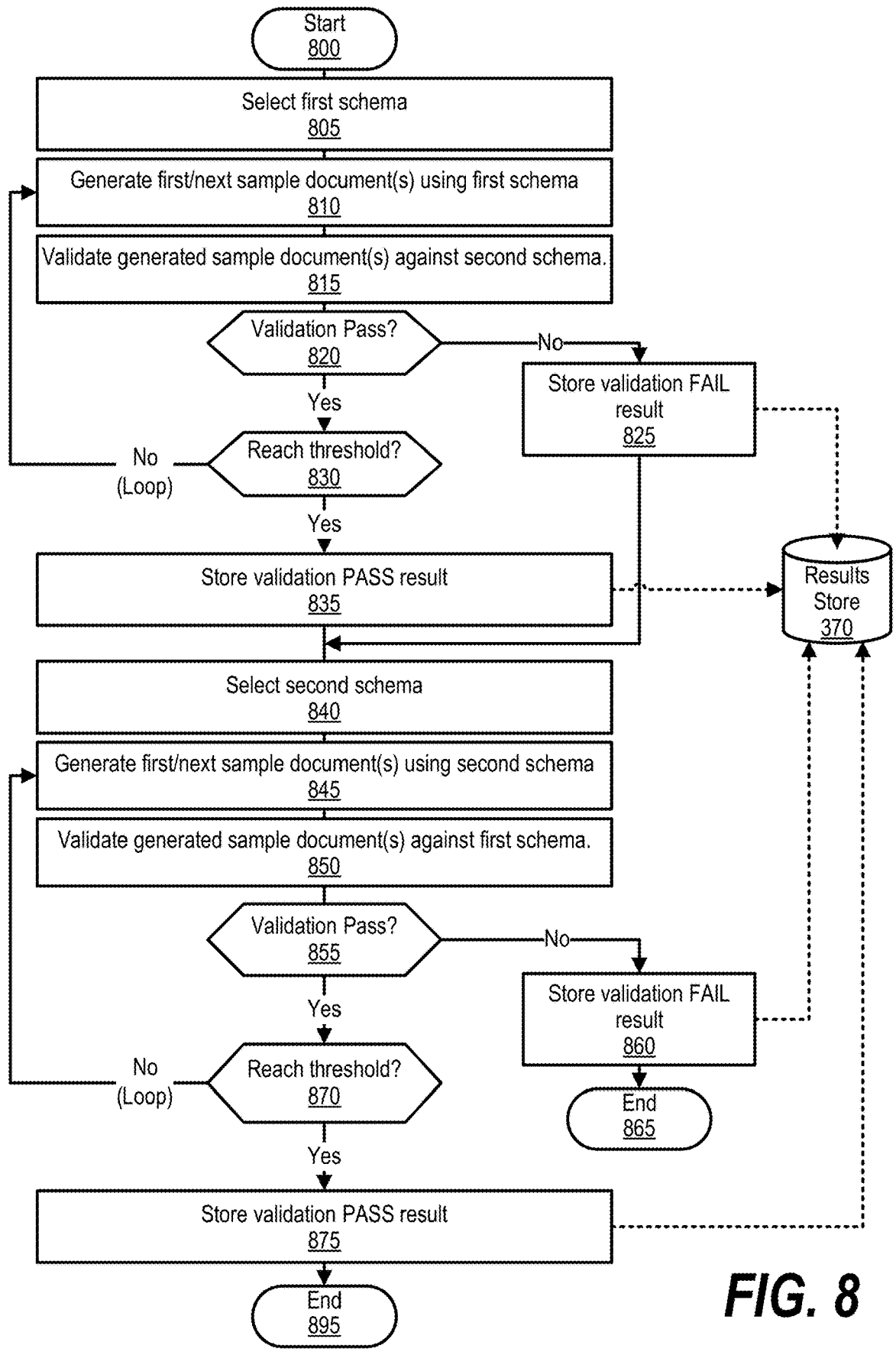
FIG. 8 is an exemplary flowchart showing steps taken to generate sample documents using a schema and validate the sample documents using a different schema.

FIG. 8 is an exemplary flowchart showing steps taken to generate sample documents using a schema and validate the sample documents using a different schema. Processing commences at 800 whereupon, at step 805, the process selects first schema 310 and, at step 810, the process generates a first sample document (or a first set of sample documents) using first schema 310. At step 815, the process validates the generated sample document(s) against second schema 320. The process determines as to whether second schema 320 validated the sample document(s) (decision 820). If second schema 320 does not validate the sample document(s), then decision 820 branches to the 'no' branch whereupon, at step 825, the process stores a validation FAIL result in results store 370 and bypasses steps 830 and 835.

On the other hand, if second schema 320 validated the sample document(s), then decision 820 branches to the 'yes' branch whereupon the process determines as to whether the process has validated enough sample documents to reach a threshold (decision 830). For example, a user may set the threshold based on the complexity of a schema to ensure that a schema is thoroughly tested, such as a threshold of 10 sample documents for basic schemas and a threshold of 50 sample documents for complex schemas.

If the process has not reached the threshold, then decision 830 branches to the 'no' branch which loops back to generate another sample document (or set of sample documents) from first schema 310 and validates the sample document(s) against second schema 320. This looping continues until the process validates enough sample documents to reach the threshold, at which point decision 830 branches to the 'yes' branch exiting the loop. At step 835, the process stores a validation PASS in results store 370.

Next, at step 840, the process selects second schema 320 and, at step 845, the process generates a sample document (or set of sample documents) using second schema 320. At step 850, the process validates the generated sample document(s) against first schema 310.

If first schema 310 does not validate each of the sample documents, then decision 855 branches to the 'no' branch whereupon, at step 860, the process stores validation FAIL result in results store 370 and FIG. 8 processing ends at 865. On the other hand, if first schema 310 validated each of the sample documents, then decision 855 branches to the 'yes' branch whereupon the process determines as to whether the process has validated enough sample documents to reach the threshold (decision 870). If the process has not reached the threshold, then decision 870 branches to the 'no' branch which loops back to generate another sample document(s) from second schema 320 and validate the sample document (s) against first schema 310. This looping continues until the process validates enough sample documents to reach the threshold, at which point decision 870 branches to the 'yes' branch exiting the loop.

At step 875, the process stores a validation PASS in results store 370 and FIG. 8 processing ends at 895. Schema comparer tool 330, in turn, analyzes the results stored in results store 370 to determine a type of equivalence between first schema 310 and second schema 320 (see FIG. 9 and corresponding text for further details).

Figure 9:
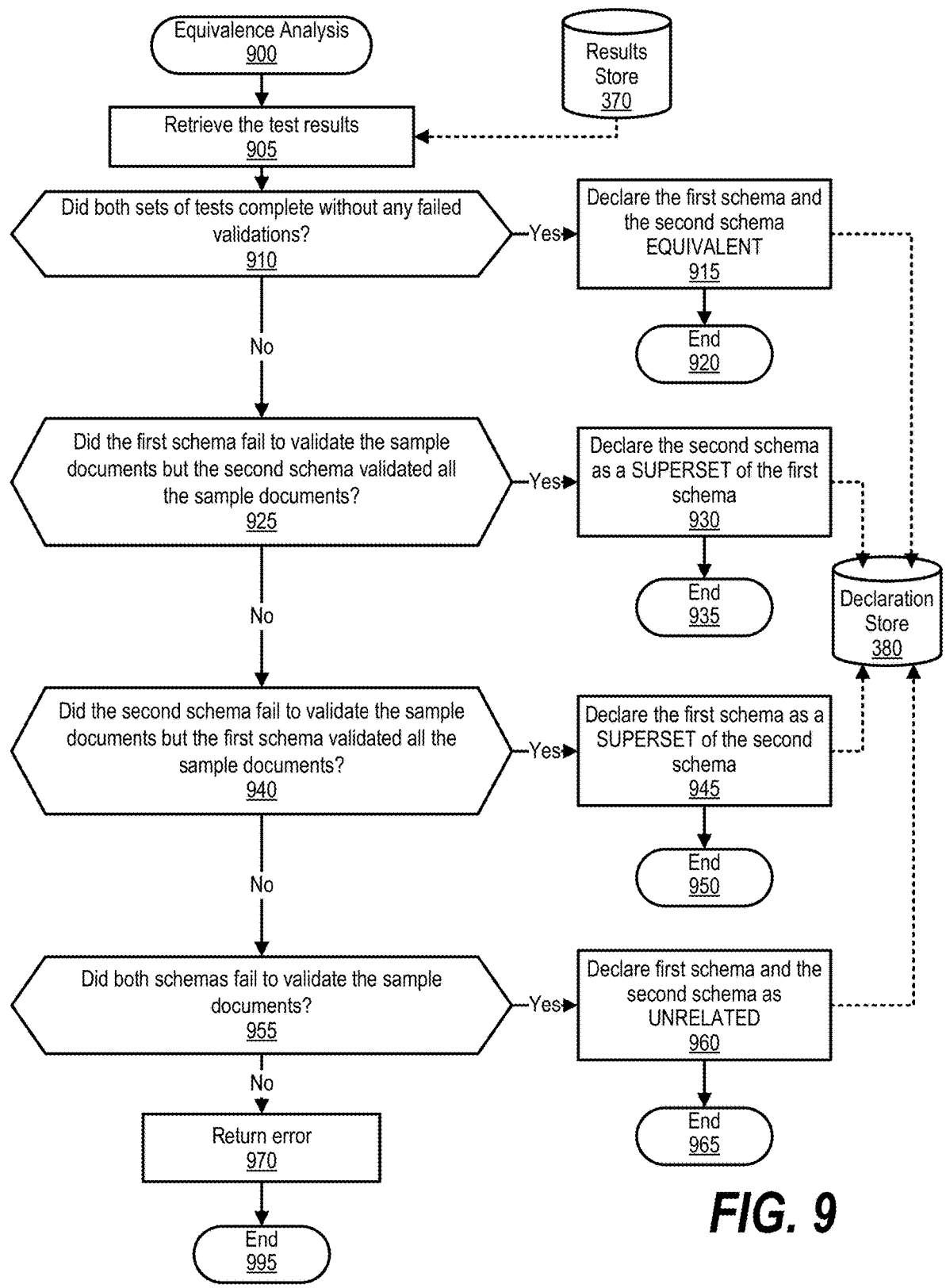
FIG. 9 is a flowchart showing steps taken to determine a type of equivalence between two schemas.

FIG. 9 is a flowchart showing steps taken to determine a type of equivalence between two schemas. FIG. 9 processing commences at 900 whereupon, at step 905, the process retrieves the test results from results store 370. The process determines as to whether both sets of tests (first schema test and second schema test) completed without any failed validations (decision 910). If both sets of tests completed without any failed validations, then decision 910 branches to the 'yes' branch whereupon, at step 915, the process declares the first schema and the second schema as EQUIVALENT within a given confidence and stores the declaration in declaration store 380. FIG. 9 processing thereafter ends at 920.

On the other hand, if both sets of tests did not complete without any failed validations, then decision 910 branches to the 'no' branch. The process determines as to whether the first schema failed to validate the sample documents generated from the second schema, but the second schema validated all the sample documents generated from the first schema (decision 925). If the first schema failed to validate the sample documents generated from the second schema, but the second schema validated all the sample documents generated from the first schema, then decision 925 branches to the 'yes' branch whereupon, at step 930, the process declares the second schema as a SUPERSET of the first schema and stores the declaration in declaration store 380. FIG. 9 processing thereafter ends at 935.

On the other hand, if decision 925 is false, then decision 925 branches to the 'no' branch whereupon the process determines as to whether the second schema failed to validate the sample documents generated from the first schema, but the first schema validated all the sample documents generated from the second schema (decision 940). If the second schema failed to validate the sample documents generated from the first schema, but the first schema validated all the sample documents generated from the second schema, then decision 940 branches to the 'yes' branch whereupon, at step 945, the process declares the first schema as a SUPERSET of the first schema and stores the declaration in declaration store 380. FIG. 9 processing thereafter ends at 950.

On the other hand, if decision 940 is false, then decision 940 branches to the 'no' branch whereupon the process determines as to whether both schemas failed to validate the sample documents (decision 955). If both schemas failed to validate the sample documents, then decision 955 branches to the 'yes' branch whereupon, at step 960, the process declares the first schema and the second schema as UNRELATED and stores the declaration in declaration store 380. FIG. 9 processing thereafter ends at 965.

On the other hand, if decision 955 if false, then decision 955 branches to the 'no' branch whereupon, at step 970, the process returns an error and FIG. 9 processing thereafter ends at 995.

FIG. 10 is an exemplary diagram depicting two complex schemas. Although schema 1000 and schema 1020 appear vastly different due to their different constructs, both schemas generate equivalent documents. As such, using the approach discussed herein, schema validator 360 declares schema 1000 and schema 1020 equivalent within a given confidence value.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    generating a first set of sample documents based on a first schema and generating a second set of sample documents based on a second schema;
    determining a first set of validation results by validating the first set of sample documents against the second schema;
    determining a second set of validation results by validating the second set of sample documents against the first schema; and
    declaring a type of equivalence between the first schema and the second schema based on analysis of both the first set of validation results and the second set of validation results.

2. The method of claim 1 wherein the first schema and the second schema are written in a same software language, and wherein the second schema comprises at least one structural difference from the first schema.

3. The method of claim 1 wherein the generating of the first set of sample documents further comprises:
    identifying at least one boundary condition corresponding to a range included in the first schema; and
    generating a first one of the first set of documents based on the identified at least one boundary condition.

4. The method of claim 1 wherein the declaring further comprises:
    determining that the first schema and the second schema are equivalent in response to the analysis indicating that the first schema validated each of the second set of sample documents and the second schema validated each of the first set of sample documents.

5. The method of claim 4 further comprising:
    computing a confidence value based on a first amount of the first set of sample documents and a second amount of the second set of sample documents; and
    storing the confidence value with the declaration.

6. The method of claim 1 further comprising:
    declaring the second schema a superset of the first schema in response to:
        determining that of the second set of validation results indicates that the second schema validated each of the first set of sample documents; and
        determining that of the first set of validation results indicates that the first schema failed to validate at least one of the second set of sample documents.

7. The method of claim 1 further comprising:
    declaring the first schema and second schema as unrelated in response to:
        determining that the second set of validation results indicates that the second schema failed to validate at least one of the first set of sample documents; and
        determining that the first set of validation results indicates that the first schema failed to validate at least one of the second set of sample documents.

8. An information handling system comprising:
    one or more processors;
    a memory coupled to at least one of the processors;
    a set of computer program instructions stored in the memory and executed by at least one of the processors in order to perform actions of:
        generating a first set of sample documents based on a first schema and generating a second set of sample documents based on a second schema;
        determining a first set of validation results by validating the first set of sample documents against the second schema;
        determining a second set of validation results by validating the second set of sample documents against the first schema; and
        declaring a type of equivalence between the first schema and the second schema based on analysis of both the first set of validation results and the second set of validation results.

9. The information handling system of claim 8 wherein the first schema and the second schema are written in a same software language, and wherein the second schema comprises at least one structural difference from the first schema.

10. The information handling system of claim 8 wherein the processors perform additional actions comprising:
    identifying at least one boundary condition corresponding to a range included in the first schema; and
    generating a first one of the first set of documents based on the identified at least one boundary condition.

11. The information handling system of claim 8 wherein the processors perform additional actions comprising:
    determining that the first schema and the second schema are equivalent in response to the analysis indicating that the first schema validated each of the second set of sample documents and the second schema validated each of the first set of sample documents.

12. The information handling system of claim 11 wherein the processors perform additional actions comprising:
    computing a confidence value based on a first amount of the first set of sample documents and a second amount of the second set of sample documents; and
    storing the confidence value with the declaration.

13. The information handling system of claim 8 wherein the processors perform additional actions comprising:
    declaring the second schema a superset of the first schema in response to:
        determining that the second set of validation results indicates that the second schema validated each of the first set of sample documents; and determining that the first set of validation results indicates that the first schema failed to validate at least one of the second set of sample documents.

14. The information handling system of claim 8 wherein the processors perform additional actions comprising:
    declaring the first schema and second schema as unrelated in response to:
        determining that the second set of validation results indicates that the second schema failed to validate at least one of the first set of sample documents; and
        determining that the first set of validation results indicates that the first schema failed to validate at least one of the second set of sample documents.

15. A computer program product stored in a computer readable storage medium, comprising computer program code that, when executed by an information handling system, causes the information handling system to perform actions comprising:
    generating a first set of sample documents based on a first schema and generating a second set of sample documents based on a second schema;
    determining a first set of validation results by validating the first set of sample documents against the second schema;
    determining a second set of validation results by validating the second set of sample documents against the first schema; and
    declaring a type of equivalence between the first schema and the second schema based on analysis of both the first set of validation results and the second set of validation results.

16. The computer program product of claim 15 wherein the first schema and the second schema are written in a same software language, and wherein the second schema comprises at least one structural difference from the first schema.

17. The computer program product of claim 15 wherein the information handling system performs further actions comprising:
    identifying at least one boundary condition corresponding to a range included in the first schema; and
    generating a first one of the first set of documents based on the identified at least one boundary condition.

18. The computer program product of claim 15 wherein the information handling system performs further actions comprising:
    determining that the first schema and the second schema are equivalent in response to the analysis indicating that the first schema validated each of the second set of sample documents and the second schema validated each of the first set of sample documents.

19. The computer program product of claim 18 wherein the information handling system performs further actions comprising:
    computing a confidence value based on a first amount of the first set of sample documents and a second amount of the second set of sample documents; and
    storing the confidence value with the declaration.

20. The computer program product of claim 15 wherein the information handling system performs further actions comprising:
    declaring the second schema a superset of the first schema in response to:
        determining that the second set of validation results indicates that the second schema validated each of the first set of sample documents; and
        determining that the first set of validation results indicates that the first schema failed to validate at least one of the second set of sample documents.

* * * * *